No. 877,526. PATENTED JAN. 28, 1908.
R. R. SMITH.
TACK AND NAIL LIFTER.
APPLICATION FILED FEB. 17, 1905.
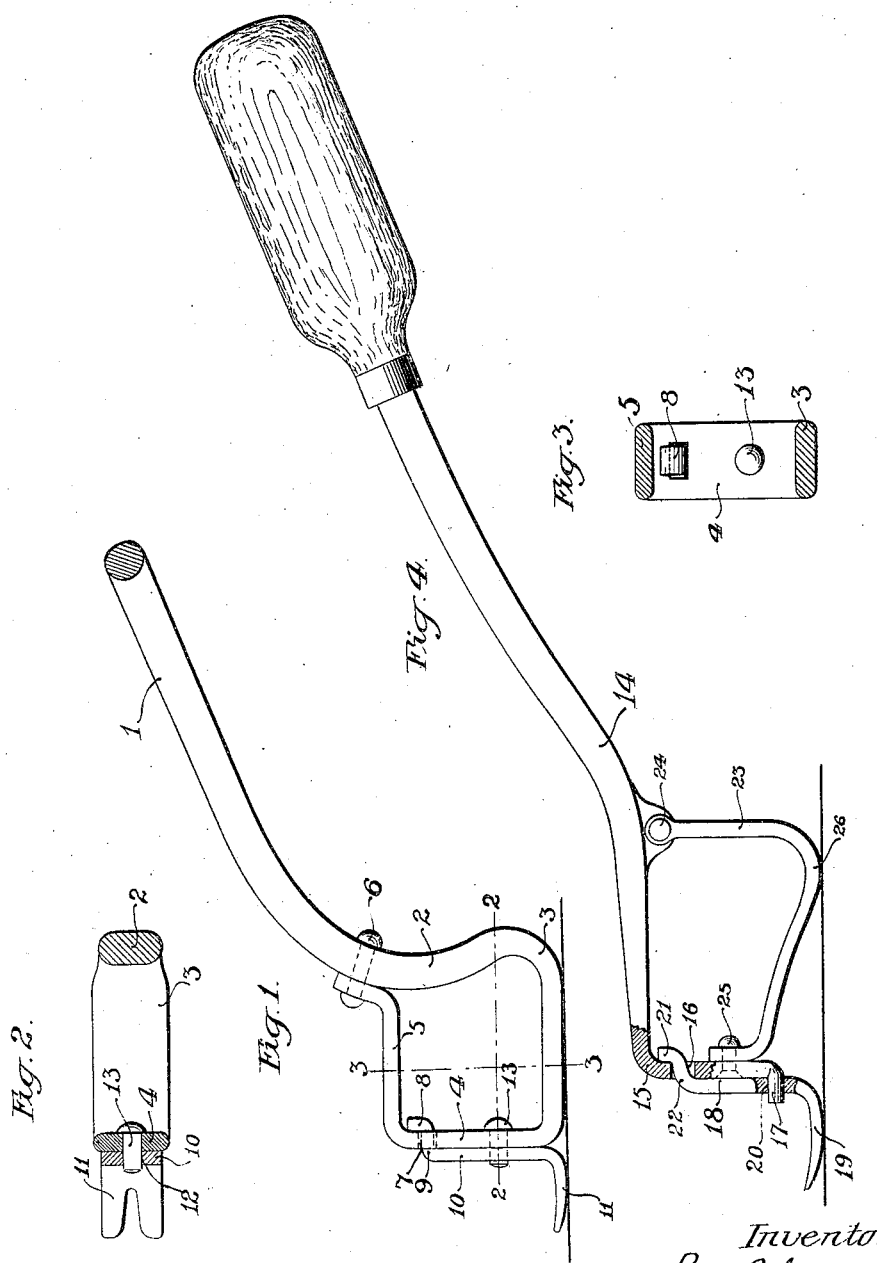
Witnesses:—
Inventor:
Robt. R. Smith
by Chas. N. Butler
Attorney.

UNITED STATES PATENT OFFICE.

ROBERT R. SMITH, OF PHILADELPHIA, PENNSYLVANIA, ASSIGNOR, BY MESNE ASSIGNMENTS, TO GENERAL SPECIALTY MANUFACTURING COMPANY, OF PHILADELPHIA, PENNSYLVANIA.

TACK AND NAIL LIFTER.

No. 877,526.  Specification of Letters Patent.  Patented Jan. 28, 1908.

Application filed February 17, 1905. Serial No. 246,029.

*To all whom it may concern:*

Be it known that I, ROBERT R. SMITH, a citizen of the United States, residing at Philadelphia, in the county of Philadelphia and State of Pennsylvania, have invented certain Improvements in Tack and Nail Lifters, of which the following is a specification.

This invention is designed particularly to provide a simple and inexpensive device that can be used interchangeably for lifting tacks, nails or staples, and which will lift the object substantially vertically and so that it will not be bent.

In the accompanying drawings, Figure 1 is a side view of an implement embodying my improvement; Fig. 2 is a sectional view taken on the line 2—2 of Fig. 1; Fig. 3 is a sectional view taken on the line 3—3 of Fig. 1 and Fig. 4 is a side elevation representing a modified form of the construction, part being broken away for the purpose of illustration.

As shown in Figs. 1, 2 and 3 of the drawings, the implement comprises the lever 1 having its lower end bent around to form the transverse strut 2, the foot 3 upon which it is fulcrumed and rocks, a substantially vertical head 4 extending transversely to the lever, and a tie member 5 secured to the lever by a rivet 6 and supporting the head. The head has an aperture or socket 7 therein through which is inserted the lug 8 and in which is seated the shoulder 9 on the shank 10 of the claw 11, the shank having a hole 12 therein which is engaged by a stud 13 set in the head.

As shown in Fig. 4, the lever 14 has the transversely extending head 15 bent thereon. The head has the hole 16 therein and the stud 17 thereon for engaging the shank 18 of a claw 19, the shank having the hole 20 which is engaged by the stud 17; and the lug 21 which passes through, and the shoulder 22 for engaging the hole or socket 16 in the head. A strut 23 is connected by a pin 24 with the lever and by a rivet 25 with the head, the strut having the foot 26 which acts as a fulcrum for the lever and connects the strut to the head.

It will be seen that the claw is readily attached and detached so that several forms thereof may be used with the same implement, while the fulcrum point is so removed from the claw that in operation the latter is lifted substantially vertically.

Having described my invention, I claim:—

An implement of the class described comprising a lever having an end thereof bent in the form of a closed loop providing a foot and a head, the head having an aperture and a stud, in combination with a claw having a shank with a leg thereon engaging said aperture and a hole therein engaged by said stud.

In testimony whereof I have hereunto set my hand this 15th day of February, A. D. 1905, in the presence of the subscribing witnesses.

ROBERT R. SMITH.

Witnesses:
 ROBERT JAMES EARLEY,
 UTLEY E. CRANE, Jr.